US006946082B1

(12) United States Patent
Watkins

(10) Patent No.: US 6,946,082 B1
(45) Date of Patent: Sep. 20, 2005

(54) APPARATUS AND METHOD FOR DEMETALLIZING A METALLIZED FILM

(76) Inventor: Jeffrey T. Watkins, 14551 268th Ave., NW., Zimmerman, MN (US) 55398

( * ) Notice: Subject to any disclaimer, the term of this patent is extended or adjusted under 35 U.S.C. 154(b) by 181 days.

(21) Appl. No.: 10/300,319

(22) Filed: Nov. 20, 2002

Related U.S. Application Data

(60) Provisional application No. 60/331,814, filed on Nov. 20, 2001.

(51) Int. Cl.[7] .......................... B44C 1/22; C03C 15/00; C03C 25/68; C23F 1/00

(52) U.S. Cl. ........................................................ 216/92

(58) Field of Search ................................ 216/100, 108, 216/109, 54, 55, 91, 92, 87, 90; 156/345.11, 156/345.2, 345.52, 345.17, 345.21

(56) References Cited

U.S. PATENT DOCUMENTS

| | | | | |
|---|---|---|---|---|
| 3,647,508 A | | 3/1972 | Gorrell | 117/38 |
| 4,090,911 A | * | 5/1978 | Shaffer | 156/499 |
| 4,348,255 A | | 9/1982 | Schmidt | 156/656 |
| 4,398,994 A | | 8/1983 | Beckett | 156/659.1 |
| 4,517,045 A | | 5/1985 | Beckett | 156/345 |
| 4,552,614 A | * | 11/1985 | Beckett | 216/92 |
| 4,610,755 A | | 9/1986 | Beckett | 156/634 |
| 4,685,997 A | | 8/1987 | Beckett | 156/629 |
| 4,735,513 A | * | 4/1988 | Watkins et al. | 383/116 |
| 4,865,921 A | | 9/1989 | Hollenberg et al. | 428/461 |
| 4,869,778 A | * | 9/1989 | Cote | 216/103 |
| 4,878,765 A | * | 11/1989 | Watkins et al. | 383/116 |
| 4,959,120 A | | 9/1990 | Wilson | 156/651 |
| 5,059,279 A | * | 10/1991 | Wilson | 216/100 |
| 5,149,396 A | | 9/1992 | Wilson | 156/656 |
| 5,221,419 A | * | 6/1993 | Beckett | 216/33 |
| RE34,683 E | | 8/1994 | Maynard et al. | 219/703 |

FOREIGN PATENT DOCUMENTS

| | | |
|---|---|---|
| EP | 0 205 304 | 12/1986 |
| EP | 0 317 203 | 5/1989 |

* cited by examiner

*Primary Examiner*—Parviz Hassanzadeh
*Assistant Examiner*—Roberts Culbert
(74) *Attorney, Agent, or Firm*—Howrey LLP; Christine M. Cochran, Esq.

(57) ABSTRACT

A system and method for at least partially demetallizing a metallized film that has a metallized side and an opposite support side. In one embodiment, the method includes rotating a heat transfer roller about an axis such that a surface of the heat transfer roller passes a heating region, a printing region and a contacting region in sequence during each rotation; heating the heat transfer roller to a first temperature; applying the film to a portion of the surface of the heated heat transfer roller with the metallized side of the film facing away from the surface of the heat transfer roller; transferring heat from the heated heat transfer roller to the film in the heating region; printing an etchant solution at a second temperature, which is lower than the first temperature, in a predetermined pattern on the metallized side of the film in the printing region, and subsequently transferring heat from the heated heat transfer roller to the film to demetallize the metallized side of the film according to the predetermined pattern in the contacting region.

29 Claims, 3 Drawing Sheets

APPARATUS AND METHOD FOR DEMETALLIZING A METALLIZED FILM

This application claims priority to U.S. Provisional Application No. 60/331,814, filed Nov. 20, 2001.

BACKGROUND OF THE INVENTION

1. Field of the Invention

This invention relates to an apparatus and method of at least partially demetallizing a metallized film. More particularly, this invention relates to an apparatus and method of selectively demetallizing a metallized film that utilizes a heat transfer roller to heat a metallized film prior to, during and after the application of a caustic solution.

2. The Prior Art

Thin metallic films are commonly used in the conversion of microwave energy, incident upon such a film, to thermal energy useful, for example, in the heating of food. It has been found that microwave energy is more efficiently converted to useful thermal energy within metallic films, such as aluminum, than within common food materials. The material to be heated is placed in close proximity, or in near contact, to such a film, so that the thermal energy produced within the film is efficiently conducted to effectively heat the material. The metallic films are typically prepared as a uniform and thin distribution of a metal on a plastic support film, such as polyester or mylar.

In some food applications, such as the microwave heating of popcorn kernels, the spatial heating pattern needs to be controlled for optimal cooking time convenience and food quality. The spatial heating pattern may be controlled by the use of a non-uniform metal distribution on a plastic support film in near contact with the food. A non-uniform metal distribution might have metallized and non-metallized areas in a pattern experimentally determined optimal. Heating is then selectively affected near the metallized areas. A non-uniform metal distribution upon a plastic support film may be produced through the selective demetallization of a uniform distribution. Thus, the convenience and quality of microwavable food, such as popcorn, may rely on the technology of the patterned demetallizing of otherwise uniformly metallized plastic films.

As known to people skilled in the art, currently there are several methods of demetallizing a metallized surface in a desired pattern using etchant solutions. One method is to print a patterned barrier coating, like a mask, on the surface areas where metal is to remain. The masked surface is then exposed to a highly caustic solution that removes the metal wherever the barrier coating is not present. The caustic solution is then typically rinsed from the surface and, after rinsing, the surface is dried prior to further processing. Elevated temperature and elevated etchant solution concentration each serves to speed the etching process. However, the latter involves the problematic handling of highly corrosive materials. Thus, it is preferred that the etching process occur at an elevated temperature.

U.S. Pat. No. 4,517,045 to Beckett discloses an apparatus and method for printing a barrier coating on the areas of a metallized film where metal is to remain throughout an etching process. An etchant-resistant barrier material is applied to a patterned roller which transfers then a patterned barrier material to a metallized film. A sodium hydroxide etchant solution is then applied to the film from a wet roller. Etching occurs at the areas unprotected by the patterned barrier material. It is disclosed that etching is preferably affected by the application of heated sodium hydroxide etchant. This is accomplished according to the teaching of Beckett by heating the wet roller, thus the etchant is hot when applied to the metallized surface. This type of selective etching method may suffer several problems. The application of a patterned barrier material to the metallized film is a step that may be avoided to simplify the process. The direct heating of the etchant solution, on the wet roller, may cause undesirable drying which does not efficiently serve the needs to apply the solution to the metallized film. Furthermore, the etched film must then be rinsed and dried prior to further processing.

Another method of selectively demetallizing a uniform metal distribution on a plastic backing film does not include the ultimate removal of the selected metal from the film. A selected break-up of the uniform distribution has been found to be sufficient for the control of spatial heating under microwave radiation. A metal may become distributed non-uniformly into tiny islands upon the backing film, and such an arrangement does not provide for the efficient conversion of radiant microwave energy to useful thermal energy.

As disclosed in U.S. Pat. No. 4,685,997 to Beckett, a chemical etchant pattern is printed on a first polymer film which is then laminated onto a metallized second polymer film. The etching occurs after lamination without the need for elevated temperatures. However, this method may have a number of disadvantages. First, in the preferred embodiment the etchant is printed on a web that is subsequently laminated to the metal-coated surface of an adjacent web. While this is possible, it means that the etchant becomes the "adhesive" to mechanically bond the sheets together with strength adequate to sustain the secondary uses of the laminate such as forming and filling a finished package. Furthermore, a method of bonding the remaining metallized surface must be provided. Bonding the untouched metal surface must be accomplished without adding a barrier between the caustic and the metal. Still further the invention claims to be useful in laminating two non porous sheets with aqueous "solutions" while still claiming that the etchant need not be dry before the webs are brought together. This process is known as wet bonding and is used only when one or both sheets are porous enough to allow the laminating medium to dry. Still another disadvantage is that when the (wet) demetallizing solution is pressed onto the adjacent sheet, the previously undisturbed pattern may squeeze out resulting in loss of the intended pattern.

In another example, Beckett describes printing the etchant solution directly on the metal. This method may have the same drawbacks. If one attempts to overcome these drawbacks by providing at least one web of a porous material two results are likely. First, if the etchant is printed on the porous web it will be absorbed into the sheet allowing little or no etchant on the surface to demetallize its adjacent sheet. Second, if the etchant is printed on the non-porous metallized sheet the etchant will be neutralized by the overall lamination adhesive as the sheets are brought together.

Another demetallizing method that is taught in U.S. Pat. No. 4,959,120 to Wilson. A major differentiation is that Wilson does not use the barrier coating. The etchant is printed on the areas where metal is to be removed. The etchant is then allowed enough time to remove the metal. The next step is to rinse the etchant from the film to provide a clean surface that can later be laminated or printed. Again, one of the last steps involves drying the film after rinsing. In addition to the drawbacks in drying the film this process has an additional flaw. The highly caustic etchant actually washes over non-barrier coated metal areas that should not be disrupted. This process typically uses a high pH solution that is printed with conventional printing methods and such hot "inks" do not print well because the "caustic ink" tends to dry on plates, rollers, etc. before being transferred to the substrate. Furthermore, the rinsing operation becomes very critical because the caustic typically has come in contact with the areas that are not to be demetallized. Any etchant left on the metal areas because of rinsing can continue to eat the metal away for days or weeks after the product has been produced.

What is needed then, is a method of manufacturing patterned metallized films in a rapid and cost efficient manner. A method utilizing heated demetallizing with an etchant should provide rapid manufacturing and avoid the problematic handling of high-concentration etchants. Further, as in all manufacturing, simple methods using only a minimal number of steps should provide cost efficiency by lowering equipment costs. Specifically the rinsing of an etchant from a patterned demetallized film is preferably avoided.

SUMMARY OF THE INVENTION

The above-noted disadvantages of the prior art are overcome by the present invention, which in one aspect is a method of demetallizing a metallized film. In one embodiment, the method uses conventional flexographic printing to apply an etchant solution to a moving metallized film. In one example, the film is at least partially wrapped onto a heat transfer device, such as, for example, a heat transfer roller and is directly printed with a patterned etchant solution from a pattern transfer roller. This method results in efficient heat transfer to the patterned demetallizing process thus speeding the process for rapid assembly line use while avoiding undesirable heating of corrosive baths or etchant soaked rollers. The process is fast enough to allow direct lamination of the patterned film to a backing paperboard without rinsing or barrier coating.

The etching solution used in the present invention may be of relatively low concentration and/or low pH. The temperatures utilized by the heat transfer device may be quite high as the film is partially wrapped around the heat transfer roller to control film distortion and because the etching effectiveness is enhanced at elevated temperatures. Normally, the etching solution is not heated prior to application to the metallized film to minimize problematic drying of the solution on heated rollers and the viscosity and evaporative concentration changes inherent in heated solution baths.

The present invention provides for fine demetallizing patterns that are easily realized with few steps. The etchant solution is not washed over the portions of the film that are to remain metallized and there is no required etchant resistant masking. Further, the possibility of etchant solution drift due to squeezing during lamination prior to complete etching is minimized or avoided.

In one aspect, the present invention relates to a system and method for demetallizing a metallized film that has a metallized side and an opposite support side. In one embodiment, the system includes heating means to heat the film substantially to a first temperature, and printing means to print an etchant solution at a second temperature in a pattern on the metallized side of the film. The second temperature is lower than the first temperature.

In one example, the heating means may include a moving surface and a heat source to keep the moving surface at the first temperature. The film is positioned on the moving surface with the support side of the film in contact with the moving surface so that the film is carried in concert with the moving surface and so that heat may be transferred from the moving surface to the film to heat the film to substantially the desired first temperature.

A heat transfer roller having a body and a surface may be provided. The heat transfer roller is rotatable about an axis to provide the moving surface. The moving surface may also be associated with a heat transfer device having a transfer belt with a substantially flat surface and a drive engaged with the transfer belt, the transfer belt providing the moving surface. In one example, the heat source is in communication with a liquid supply kept substantially at the first temperature.

The printing means may include a pattern transfer roller having an exterior surface. The exterior surface of the pattern transfer roller being in fluid communication with a supply of etchant solution so that a least a portion of the exterior surface of the pattern transfer roller carries etchant solution is a predetermined pattern. The pattern transfer roller is constructed and arranged to be engaged with the metallized side of the film. The etchant solution being printed in the predetermined pattern on the metallized side of the film when the film passes between and in contact in with a portion of the moving surface and a portion of the pattern transfer roller (i.e., when the film passes through a nip formed by the moving surface and the exterior surface of the pattern transfer roller).

The system may further include means for keeping the film substantially at the first temperature to speed up the demetallization of the metallized side of the film according to the pattern. Additionally, the system may include a means for preparing a backing material having a first side with a lamination thereon; a means for applying the film to the backing material with the metallized side of the film facing the first side of the backing material; and a means for laminating the film to the backing material. In one embodiment, the laminating means may include a means for heating the film and the backing material to substantially a third temperature and a means for cooling the film and the backing material to substantially a fourth temperature. In this example, the heating means comprises a second heat transfer roller heated at the third temperature, a portion of the second heat transfer roller engaging the film and the backing material through a second side of the backing material. The cooling means may comprise a third heat transfer roller heated at the fourth temperature, a portion of the third heat transfer roller engaging the film and the backing material through the second side of the backing material. In these examples, the first temperature is higher than any one of the second, third and fourth temperatures, and the fourth temperature is lower than any one of the first, second and third temperatures. Further, the fourth temperature is less than the third temperature.

BRIEF DESCRIPTION OF THE FIGURES OF THE DRAWINGS

The accompanying drawings, which are incorporated in and constitute a part of the specification, illustrate several embodiments of the invention and together with the description, serve to explain the principals of the invention.

DETAILED DESCRIPTION OF THE INVENTION

Figure 1:
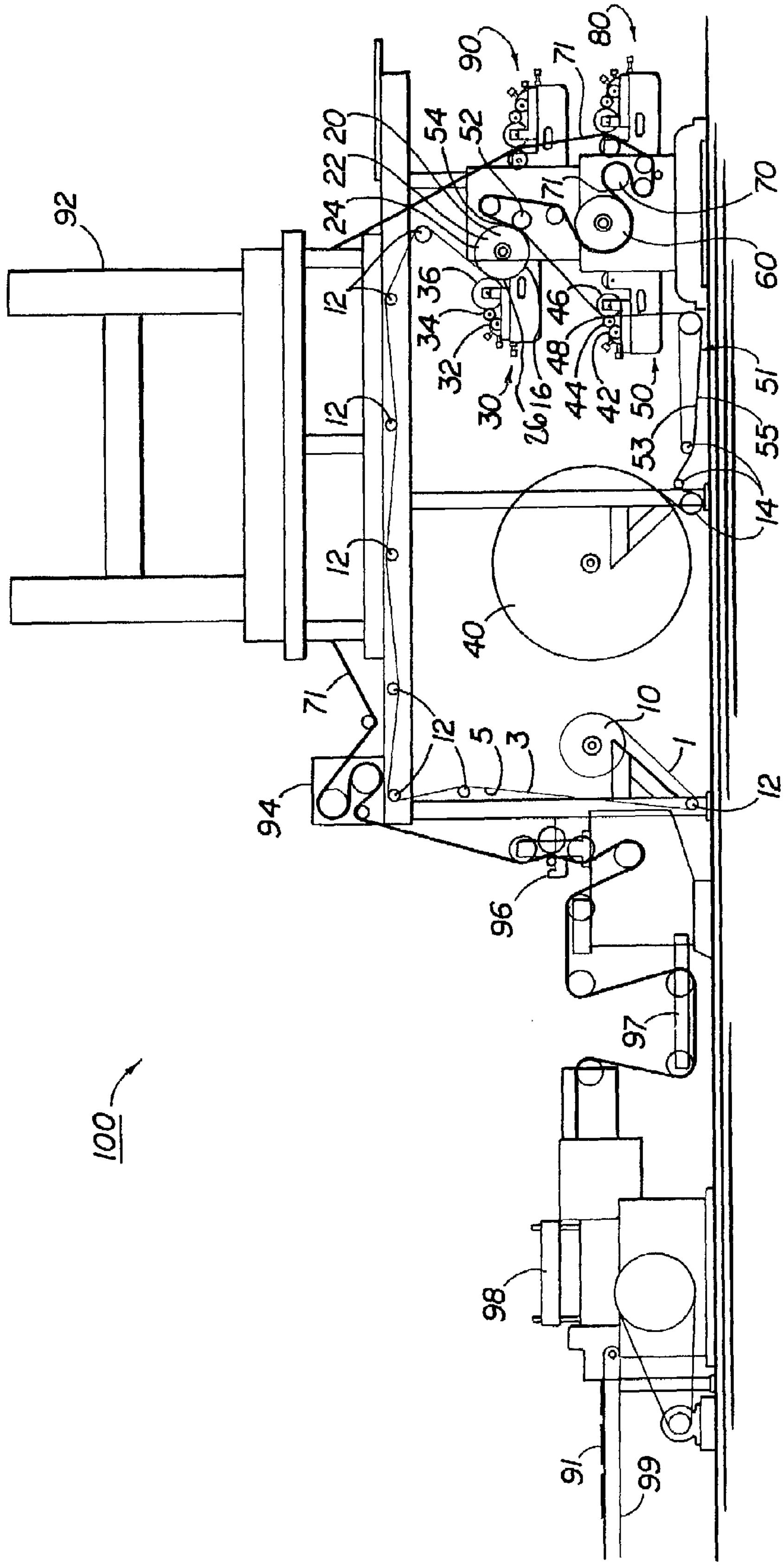
FIG. 1 is a schematic representation of an apparatus for carrying out the method in one embodiment in accordance with the present invention.

The present invention is more particularly described in the following examples that are intended to be illustrative only since numerous modifications and variations therein will be apparent to those skilled in the art. As used in the specification and in the claims, the singular form "a," "an" and "the" include plural referents unless the context clearly dictates otherwise. Also, the meaning of "in" includes "in" and "on" unless the context clearly dictates otherwise. Referring to the drawing, like numbers indicate like parts throughout the figures.

Referring in general to FIGS. 1–5, various embodiments of the system and apparatus for carrying out the method(s) of the present invention are shown. In one embodiment, in particular referring first to FIG. 1, the present invention provides a system 100 for metal removal from or demetallizing a metallized film. In the present invention, the metallized film 1 has a metallized side 3 and an opposite support side 5. For example, a commercially available vacuum metallized polyester support film may be utilized. The term demetallization herein refers to a process whereby, a substantially uniform metallization layer, for example aluminum, distributed on a support film, for example polyester or mylar, is rendered non-uniform across the support film surface such as by removal, chemical reaction, or redistribution of the metallization layer. The efficiency of the conversion of incident microwave energy to thermal energy in a demetallized area is substantially affected, for example lowered.

The system may include a heating means for heating the metallized film to substantially a first temperature and a printing means for printing an etchant solution at a second temperature in a predetermined pattern on a metallized side of the film. The second temperature is generally lower than the first temperature.

In one example, the heating means may include a non-moving surface and a heat source constructed and arranged to maintain the moving surface at the first temperature. In this example, the film is positioned on a portion of the non-moving surface with the support side of the film in contact with the portion so that heat is transferred from the moving surface to the film and heats the film to substantially the first temperature.

In another example, the heating means may include a moving surface 16 and a heat source 18 constructed and arranged to maintain the moving surface at the first temperature. Here, the film 1 is positioned on a portion of the moving surface with the support side of the film in contact with the portion of the moving surface so that heat is transferred from the moving surface to the film and heats the film to substantially the first temperature.

Figure 2:
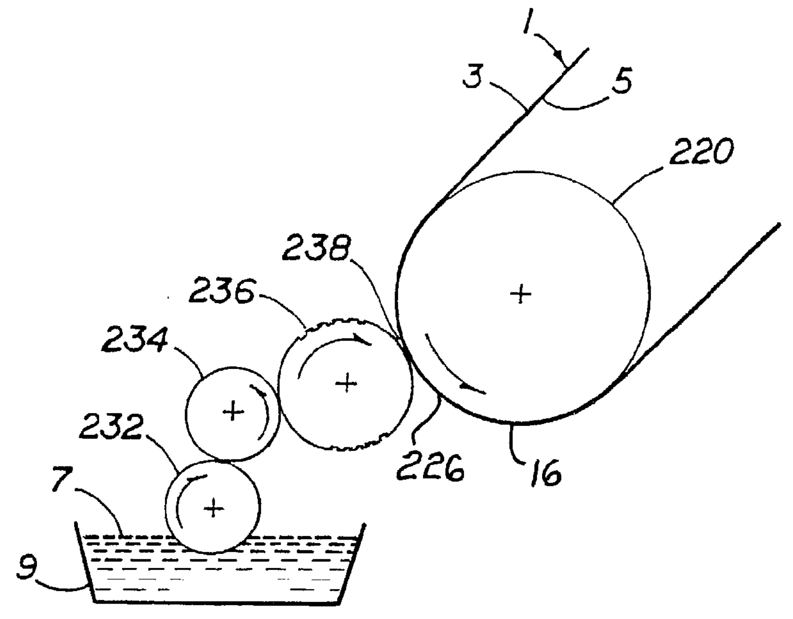
FIG. 2 is a partial schematic representation of an apparatus for carrying out the method in one embodiment in accordance with the present invention as shown in FIG. 1.
Figure 3:
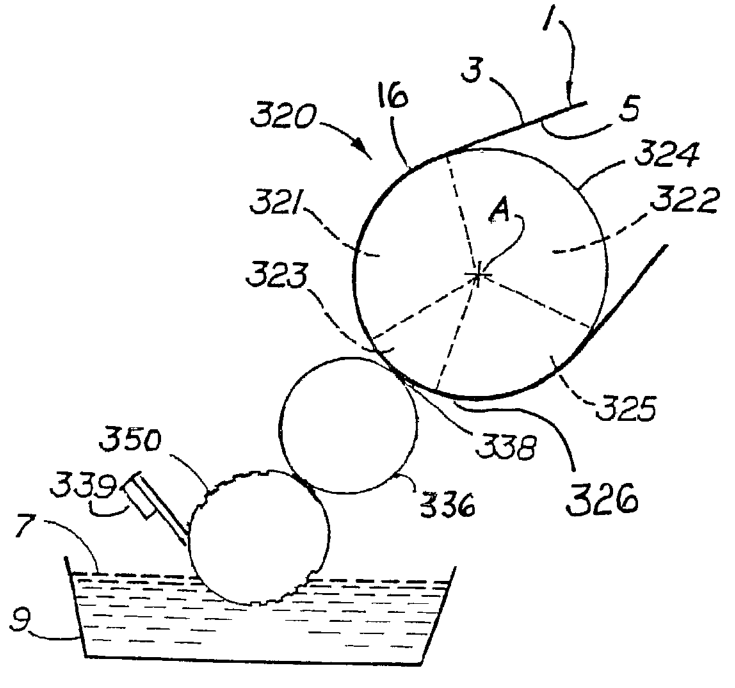
FIG. 3 is a partial schematic representation of an apparatus for carrying out the method in another embodiment in accordance with the present invention.
Figure 4:
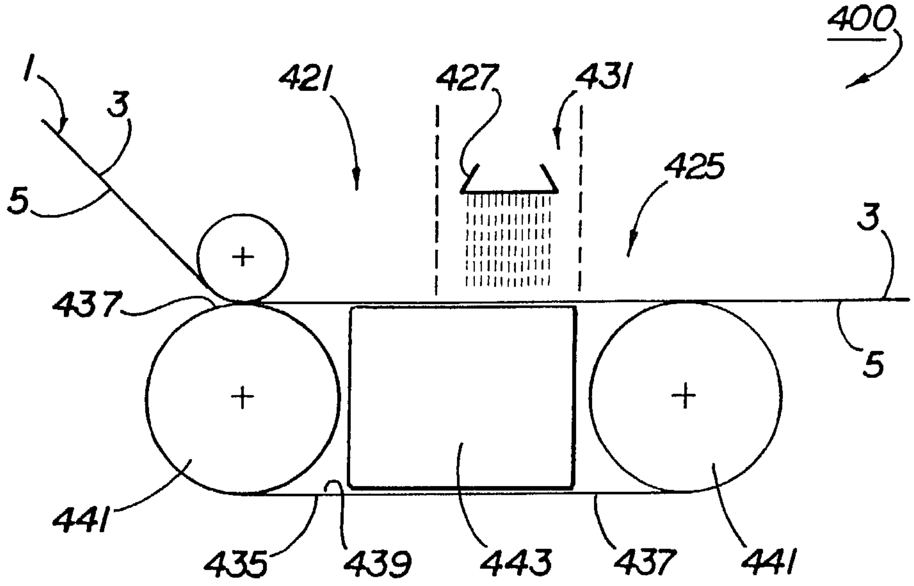
FIG. 4 is a partial schematic representation of an apparatus for carrying out the method in yet another embodiment in accordance with the present invention.

In one example, as shown in FIGS. 1–3, the heating means includes a heat transfer device in the form of a heat transfer roller 20 having a body 22 and an exterior surface 24. In this example, the heat transfer roller is rotatable about an axis and the exterior surface of the heat transfer roller forms the moving surface 16. Alternatively, as shown in FIG. 4, the heating means may include a heat transfer device in the form of a heat transfer assembly 400. The exemplified heat transfer assembly has a continuous transfer belt 435 with a substantially flat surface 437 and a drive 441 engaged with the transfer belt. A portion of the transfer belt forms the moving surface 16.

In the exemplified system shown in FIG. 1, the metallized film 1 is fed at a proper speed (in one example, about and between approximately 200–250 feet per minute) among guides 12 from a film supply roll 10 to be at least partially wrapped around a heat transfer roller 20, which is heated at the first temperature. The heat transfer roller 20 can be an impression roller. The heat transfer roller 20 has a cylindrical body 22 and an exterior surface 24 extending about the circumference of the heat transfer roller. The metallized film 1 is positioned on at least a portion of the heat transfer roller 20 such that the support side 5 of the film 1 is in direct contact with the surface 24 of the heat transfer roller 20 and the metallized side 3 of the film 1 faces away from the surface 24 of the heat transfer roller 20. In operation, the heat transfer roller 20 rotates about an axis so that the exterior surface of the heat transfer roller forms the moving surface. As one will appreciate, while positioned in contact with the moving surface 16, the film 1 is carried in motion with the moving surface.

Referring now to FIG. 3, where another embodiment of a portion of the present invention is shown, a heat transfer roller 320 has a body 322 and an exterior surface 324. The heat transfer roller 320 rotates about an axis A so that the exterior surface 324 forms a moving surface 330. In each rotation, the surface 324 of the heat transfer roller 320 passes a heating region 321, a printing region 323 and a contacting region 325. When the film 1 is positioned on a portion of the exterior surface 324 of the heat transfer roller 320, the moving surface of the heat transfer roller 320 carries the film 1 past the heating region 321, the printing region 323 and the contacting region 325 in sequence. The heat transfer roller 320 is heated and maintained at substantially a first temperature. In one example, the first temperature is about and between approximately 100–200° F., in another example, about and between approximately 120–180° F., and, in yet another example, about and between approximately 130–170° F.

In the heating region 321, the film 1 is heated to substantially the first temperature by direct contact with the surface 324 of the heat transfer roller 320. At the printing region 323, an etchant solution is printed at a second temperature in a predetermined pattern 326 on the metallized side 3 of the film 1, which is being maintained in contact with the surface 324 of the heat transfer roller 320 to aid in maintaining the temperature of the film at substantially the first temperature. In this example, the first temperature is generally higher than the second temperature. In one example, the second temperature is about and between approximately 50–100° F., in another example, about and between approximately 60–90° F., and, in yet another example, about and between approximately 70–80° F.

At the contacting region 325, the film 1, now with the predetermined etchant solution pattern printed to the metallized side 3, is being continuously kept in contact with the surface 324 of the heat transfer roller 320 to maintain the temperature of the film substantially at the first temperature so as to facilitate the demetallization of the metallized side 3 of the film 1 according to the etchant solution pattern.

Referring to FIGS. 1–3, exemplified printing means are shown. Generally, the printing means includes a supply of etchant solution 9 and a pattern transfer roller 38. The pattern transfer roller 38 has an exterior surface 37 that is in fluid communication with the supply of etchant solution. At least a portion of the exterior surface of the pattern transfer roller carries the etchant solution thereon in the predetermined pattern 26. In operation, at least a portion of the pattern transfer roller 38 is engaged with the metallized side 3 of the film to transfer etchant solution 7 in the predetermined pattern onto the metallized side of the film. As one will appreciate, the printing means may include conventional printing methods and apparatus, such as, for example, conventional flexographic printing, for printing the etchant solution in the predetermined pattern on the metallized side of the film.

In one example, shown in FIG. 1, at a etchant print station 30, a fountain pickup roller 32 picks up an etchant solution from the supply of etchant solution 9 and applies it onto a patterned annilox engraving roller 34, which, in turn, disposes the etchant solution on a transfer cylinder or pattern transfer roller 36 in the predetermined etchant solution pattern. The pattern transfer roller 36 applies the etchant solution pattern to the metallized side 3 of the film 1 at a location 338 corresponding to the printing region 323, as more clearly shown in FIG. 3. In general, the heat transfer roller 20 has a diameter larger than the caustic fountain pickup roller 32, the patterned annilox engraving roller 34 and the pattern transfer roller 36. In this example, the heat transfer roller 20 has a diameter of about 18 inches. The film 1 with the etchant solution pattern thereon then travels in the contacting region for a predetermined period of time. The etching/demetallizing process substantially occurs while the film 1 travels in the contacting region, where the film 1 is being continuously kept in contact with the exterior surface 24 of the heat transfer roller 20 that is maintained substantially at the first temperature so as to facilitate the demetallization of the metallized side 3 of the film 1 according to the predetermined etchant solution pattern as discussed before.

Etchant print station 30 can have various configurations. In one embodiment shown in FIG. 2, which is somewhat similar to the configuration shown in FIG. 1, a pickup roller 232 picks up etchant solution 7 from a supply of etchant solution 9 and applies it to an intermediate roller 234, which doctors a proper amount of etchant solution to a pattern transfer roller 236 with a predetermined etchant solution pattern defined in the exterior surface thereof. The etchant solution is printed in the predetermined pattern on the metallized side of the film when the film passes between and in contact with a portion of the moving surface and a portion of the pattern transfer roller (i.e., the pattern transfer roller 236 forms a nip 238 with a heat transfer roller 220 to apply the etchant solution pattern to the metallized side 3 of the film 1 when the film 1 passes through the nip 238). The film 1 is heated to and maintained at a first temperature by contact with the heat transfer roller 220.

In another embodiment as shown in FIG. 3, a pickup roller 350 picks up etchant solution 7 from a supply of etchant solution 9. A reverse angle doctor blade 339 doctors a proper amount of caustic solution to the pickup roller. In this example, the pickup roller 350 has a predetermined etchant solution pattern defined in an exterior surface thereof. The pickup roller doctors a proper amount of etchant solution to a pattern transfer roller 236. As described above, the etchant solution 7 is printed in the predetermined pattern on the metallized side 3 of the film when the film passes between and in contact with a portion of the moving surface and a portion of the pattern transfer roller (i.e., nip 338). The film 1 is heated to and kept at a first temperature by contact with the heat transfer roller 320.

In yet another embodiment as shown in FIG. 4, the heat transfer device in the form of a heat transfer assembly is shown. The exemplified heat transfer assembly has a continuous transfer belt 435 with a substantially flat first surface 437 and an opposite second surface 439. At least one drive 441 engages the transfer belt 435 through the second surface 439 to cause the transfer belt 435 to move along a transfer path. A heat source 443 transfers heat to the transfer belt 435 and keeps the transfer belt 435 substantially at a first temperature. The heat source 443 can be a tank or pipe in fluid communication with a liquid supply (not shown), such as, for example, a hot water tank. The liquid supply is maintained at substantially the first temperature. As one will appreciate, the heat source 443 can be heated and kept at the first temperature by electric heating, gas heating, liquid heating, or a combination of them.

In operation, the film 1 is applied to the moving first surface 437 at region 421. An etchant solution is applied to the metallized side 3 of the film 1 at region 431 in the predetermined pattern by an etchant solution applier 427. The etchant solution applier 427 can take various conventional forms such as, for example, an ink jet printer or sprayer. The film 1 is kept at the first temperature by contact with the transfer belt 435 at region 425 to facilitate the demetallization of the metallized side 3 of the film 1 in accord with the predetermined pattern.

As discussed above, prior art demetallizing methods and systems often require an etchant solution that has a higher pH value. In contrast, the present invention allows a wide range of etchant solutions to be used because, in the present invention, the film is heated (not the etchant solution) and kept at a higher temperature than that of the etchant solution to allow a more efficient heat transfer and thus quicker demetallization process. In one example, the etchant solution 7 has a pH value about and between approximately 10–14 pH, in another example, about and between approximately 11–13.8 pH, and, in yet another example, about and between approximately 12.5–13.5 pH can be utilized to practice the present invention. In one further embodiment, an etchant solution that has a pH value in the range of 13.0 to 13.2 pH is utilized. In one particular example, an etchant solution having the following composition

| Ingredient | % |
|---|---|
| Water | 49.9 |
| Durocet 12 | 26.66 |
| Sodium Hydroxide (50% Solution) | 21.0 |
| Isopropyl Alcohol | 2.44 |

is used in one embodiment of the present invention. This etchant solution 7 has a pH value about 13.1 pH. The Durocet 12 is supplied by Franklin International, and the sodium Hydroxide is supplied by Prillman Chemical Corp.

Figure 5:
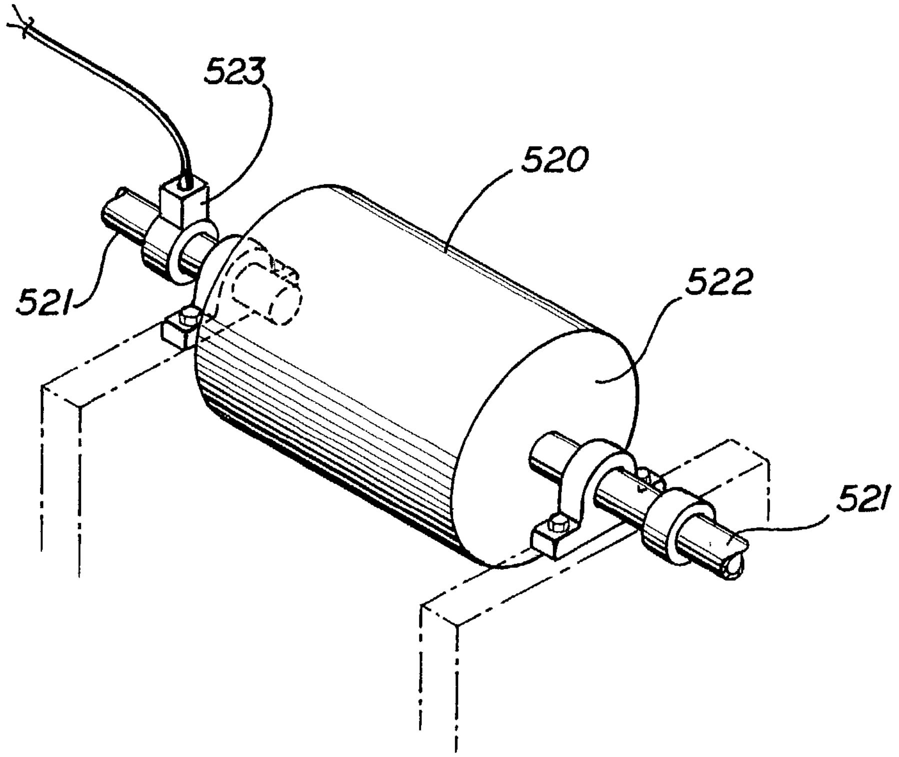
FIG. 5 is a partial perspective view showing of an apparatus for carrying out the method in one embodiment in accordance with the present invention.

As one will appreciate, the heat transfer roller 20 can be heated and kept at the first temperature by electric heating, gas heating, liquid heating, or a combination of them. In one embodiment as shown in FIG. 5, at least one pipe 521 is in fluid communication with a liquid supply, such as, for example, hot water, that is maintained at substantially the first temperature. The pipe 521 goes through at least a portion of the body 522 of the heat transfer roller 520 to allow the liquid to transfer heat to the heat transfer roller 520. A thermocouple device 523 may be used to monitor the temperature of the heat transfer roller 520 and/or the pipe 521. Optionally, the thermocouple device 523 may be connected to a thermostat 524 that can be set to the desired temperature. The thermostat 524 may selectively energize the heating coils 526 in the liquid supply 528 to maintain the selected temperature of fluid medium 530, which is circulated by pump 532 through pipe(s) 521 to the heat transfer roller 520.

The system may also include a backing material 51, a means for applying the at least partially demetallized film to the backing material, and a means for laminating the film to the backing material. In one example, the backing material may be a 20 point SBS paperboard backing can be fed at a proper speed (e.g., approximately in the range of 200–250 fpm) through a second series of various guides 14 from a paperboard supply roll 40 to be coated with an adhesive lamination at lamination coating station 50. The backing material 51 has a first side 53 and a second side 55 that is in direct contact with the surface of the paperboard supply roll 40 such that an adhesive lamination is applied to at least a portion of the first side 53 of the backing material 51. At the lamination coating station 50, a second pick up roller 42 picks up adhesive lamination in the form of solution and transfers it to a second printing roller 44, which doctors the amount of the adhesive lamination to be applied to the backing material 51 and forms a nip 48 with a lamination transfer roller 46. When the backing material 51 passes through the nip 48, the adhesive lamination is printed to at least a portion of the first side 53 of the backing material 51. The backing material 51 is then further transferred to pass nip 54, which is formed between the heat transfer roller 20 and a lamination roller 52. At nip 54, the patterned demetallized surface 3 of the film 1 is brought into contact with the adhesive lamination coated side, i.e., the first side 53, of the backing material 51.

The film 1 and backing material 51 now travel together to a second heat transfer roller 60 heated at a third temperature is about and between approximately 100° F. to 200° F. A portion of the second heat transfer roller engages and heats the film 1 and backing material 51 to activate the adhesive lamination so that the film 1 and backing material 51 are laminated together to form a laminated material 71. Moreover, the laminated material 71 may travel together to a third heat transfer roller 70 maintained at a fourth temperature about and between 40° F. to 60° F. A portion of the third heat transfer roller engages the film and backing material together so that the film and backing material are cooled together to the fourth temperature. The fourth temperature is lower than the third temperature in order to help cure the adhesive and form a permanent adhesion between the film 1 and backing material 51. In one example, the third temperature is about and between 120° F. and 180° F. and the fourth temperature is about and between approximately 45° F. to 55° F. In one particular example, the third temperature was about 150° F., and the fourth temperature was about 50° F.

Moreover, information such as consumer instructions and a UPC code can be printed on the backing material side of the laminated material 71 at a print station 80. A transparent heat seal coating may also be applied over the printed information at a heat seal coating station 90 to protect the printed information from removal due to further processing or use.

The laminated material 71 can be further dried by a lamination/print dryer 92 constructed and arranged to blow hot air on the laminated material 71 and subsequently cooled at an outfeed chill station 94. The laminated material 71 may then be decurled for proper flat processing at a decurling station 96 and be placed in precise handling alignment at an edge guide 97 for final cutting at a die cutter 98 to form a patterned packaging material 91, which can be stacked by a stacking conveyor 99.

The patterned packaging material 91 may later be formed into a tray, plate, bowl, or any vessel desirable or useful. For example, the patterned packaging material 91 might be shaped as a tray or incorporated into a tray construction so shaped or constructed to hold popcorn kernels or other foods. Microwave energy incident on the patterned metallized areas of the tray may be efficiently converted to heat energy useful, for example, in heating popcorn kernels or other foods.

In operation, the present invention relates to a method of at least partially demetallizing a metallized film 1. In one embodiment, the method includes the steps of heating the film substantially to a first temperature, and printing an etchant solution 7 at a second temperature in a predetermined pattern on the metallized side of the film. The second temperature is lower than the first temperature.

The heating step may include the steps of providing a moving surface 16, heating the moving surface to the first temperature, and positioning the film on a portion of the moving surface with the support side 5 of the film in contact with the moving surface so that heat is transferred from the moving surface to the film to heat the film substantially to the first temperature. The moving surface 16 can be associated with a heat transfer roller 20 that has a body 22 and an external surface 24, and the providing step may include rotating the heat transfer roller about an axis so that the moving external surface forms the moving surface 16. Alternatively, the moving surface 16 can also be associated with a heat transfer assembly 400 in which a portion of the heat transfer assembly forms the moving surface. In one example, the heat transfer assembly has a transfer belt 435 and a driver 441 and at least a part of the heat transfer belt is placed in motion by the driver to form the moving surface 16.

The printing step may comprise the steps of providing a pattern transfer roller 36 in spaced operative cooperation with a portion of the moving surface 16. The pattern transfer roller has etchant solution in the predetermined etchant solution pattern thereon. The etchant solution pattern is transferred from the pattern transfer roller 36 to the metallized side 3 of the film to demetallize the metallized side of the film according to the predetermined pattern when the film passes between the print transfer roller and the portion of the moving surface. The method may further include keeping the film substantially at the first temperature for a predetermined period of time to accelerate the demetallization of the pattern on the metallized side of the film.

Additionally, the method may include preparing a backing material 51 having a lamination thereon a first side 53 of the backing material. Subsequently, the film may be applied to the backing material 51 with the metallized side 3 of the film facing the first side 53 of the backing material and then the film is laminated to the backing material. The laminating step may include heating the film and the backing material to a third temperature and cooling the film and the backing material to a fourth temperature. The heating step includes engaging the film and the backing material together with a second heat transfer roller 60 heated at the third temperature. The cooling step includes engaging the film and the backing material together with a third heat transfer roller 70 kept at the fourth temperature. The fourth temperature is lower than the third temperature.

Although the illustrative embodiments of the present disclosure have been described herein with reference to the accompanying drawings, it is to be understood that the disclosure is not limited to those precise embodiment, and the various other changes and modifications may be affected therein by one skilled in the art without departing from the scope of spirt of the disclosure. All such changes and modifications are intended to be included within the scope of the disclosure as defined by the appended claims.

What is claimed is:

1. A method of at least partially demetallizing a film, wherein the film has a metallized side and an opposite support side, comprising:

positioning the film on at least a portion of a moving surface with the metallized side of the film facing away from the surface so that the film is carried by the moving surface, the moving surface being at a first temperature;

transferring heat from the moving surface to the film to heat the film to substantially the first temperature;

printing an etchant solution in a pre-determined pattern on the metallized side of the film, the etchant solution being at a second temperature that is lower than the first temperature;

etching the metallized side of the film in said pattern; and laminating the film to a backing material with the metallized side of the film facing the backing material.

2. The method of claim 1, wherein the moving surface is maintained at the first temperature.

3. The method of claim 2, wherein the positioning step comprises wrapping the film at least partially about at least a portion of a roller that is rotatable about an axis, the roller having an exterior surface that forms the moving surface.

4. The method of claim 1, wherein the backing material has a first side having a lamination, and wherein the laminating step comprises engaging the metallized side of the film to the first side of the backing material.

5. The method of claim 4, wherein the engaging step comprises heating the film and the backing material together to a third temperature and then cooling the film and the backing material to a fourth temperature, wherein the fourth temperature is lower than the third temperature.

6. The method of claim 5, wherein the heating step comprises engaging the film and the backing material on a second heat transfer roller heated to the third temperature.

7. The method of claim 5, wherein the cooling step comprises of engaging the film and the backing material on a third heat transfer roller heated to the fourth temperature.

8. A method of at least partially demetallizing a metallized film, wherein the film has a metallized side and an opposite support side, comprising:

rotating a heat transfer roller about an axis, the heat transfer roller having an exterior surface, the exterior surface of the heat transfer roller sequentially passing a heating region, a printing region and a contacting region during each rotation;

heating the heat transfer roller to a first temperature;

positioning the support side of the film on and about at least a portion of the exterior surface of the heated heat transfer roller so that the metallized side of the film faces away therefrom;

transferring heat from the heat transfer roller to the film through the support side of the film in the heating region to heat the film to substantially the first temperature;

printing an etchant solution at a second temperature in a predetermined pattern on the metallized side of the film in the printing region; and transferring heat from the heated heat transfer roller, along the contacting region, to the film and the etchant solution to demetallize the pattern in the metallized side of the film.

9. The method of claim 8, wherein the second temperature is lower than the first temperature.

10. The method of claim 8, wherein the printing step further comprises providing a print transfer roller with the etchant solution pattern thereon and transferring the etchant solution pattern from the print transfer roller to the metallized side of the film when the film passes between a portion of the print transfer roller and the heat transfer roller.

11. The method of claim 10, further comprising providing the etchant solution to the print transfer roller.

12. The method of claim 11, wherein the etchant solution is provided from a supply of the etchant solution.

13. The method of claim 12, wherein the etchant solution has a pH value in the range of from 10 to 14 pH.

14. A method of at least partially demetallizing a metallized film, wherein the film has a metallized side and an opposite support side, comprising: providing a moving surface;

heating the moving surface to a first temperature;

positioning the film on a portion of the moving surface with the support side of the film in contact with the portion of the moving surface so that the film is heated to substantially the first temperature; and printing an etchant solution at a second temperature in a predetermined pattern on the metallized side of the film in the printing region.

15. The method of claim 14, further comprising maintaining the film with the etchant solution pattern in contact with the portion of the moving surface for a predetermined time period so that, when in contact, heat is continuously transferred from the moving surface to the film to facilitate the demetallization of the metallized side of the film.

16. The method of claim 15, wherein the providing step comprises rotating a heat transfer roller about an axis, the heat transfer roller having an exterior surface that forms the moving surface.

17. The method of claim 15, wherein the providing step comprises moving at least a part of a heat transfer assembly, a portion of the heat transfer assembly forming the moving surface.

18. The method of claim 14, wherein the second temperature is lower than the first temperature.

19. The method of claim 18, wherein the printing step further comprises providing a print transfer roller with the etchant solution pattern thereon in spaced operative cooperation with a portion of the moving surface and transferring the etchant solution pattern from the print transfer roller to the metallized side of the film when the film passes between the print transfer roller and the portion of the moving surface.

20. A method of at least partially demetallizing a metallized film, wherein the film has a metallized side and an opposite support side, comprising:

heating the film substantially to a first temperature; and printing an etchant solution at a second temperature in a predetermined pattern on the metallized side of the heated film, wherein the second temperature is lower than the first temperature.

21. The method of claim 20, wherein the heating step comprises: providing a moving surface;

heating the moving surface to the first temperature; and positioning the film on a portion of the moving surface with the support side of the film in contact with the portion of the moving surface so that the film is heated to the first temperature.

22. The method of claim 21, wherein the providing step comprises rotating a heat transfer roller about an axis, the heat transfer roller having an exterior surface that forms the moving surface.

23. The method of claim 21, wherein the providing step comprises moving at least part of a heat transfer assembly, a portion of the heat transfer assembly forming the moving surface.

24. The method of claim 21, wherein the printing step further comprises:

providing a print transfer roller positioned in spaced operative cooperation with a portion of the moving surface, the print transfer roller having the etchant solution pattern thereon; and transferring the etchant solution pattern from the print transfer roller to the metallized side of the film when the film passes between the print transfer roller and the portion of the moving surface.

25. The method of claim 24, further comprising keeping the film substantially at the first temperature for a predetermined time period to accelerate the demetallization of the pattern on the metallized side of the film.

26. The method of claim 20, further comprising:

preparing a backing material having a first side and a second side, the first side having a lamination;

applying the film to the backing material with the metallized side of the film facing the first side of the backing material; and laminating the film to the backing material.

27. The method of claim 26, wherein the laminating step comprises:

heating the film and the backing material together to a third temperature; and cooling the film and the backing material together to a fourth temperature, wherein the fourth temperature is lower than the third temperature.

28. The method of claim 27, wherein the heating step comprises engaging the film and the backing material together with a second heat transfer roller heated at the third temperature.

29. The method of claim 27, wherein the cooling step comprises engaging the film and the backing material together with a third heat transfer roller kept at the fourth temperature.

* * * * *